United States Patent [19]

McFarland

[11] 4,084,707
[45] Apr. 18, 1978

[54] ROUND BALE LOADING AND UNROLLING MACHINE

[76] Inventor: Douglas McFarland, Davis City, Iowa 50065

[21] Appl. No.: 708,987

[22] Filed: Jul. 26, 1976

[51] Int. Cl.² ............................ B65H 17/00; B66F 9/18
[52] U.S. Cl. .................................... 214/1 HA; 214/518; 242/86.5 R
[58] Field of Search .................... 242/86.5 R, 86.52; 214/DIG. 4, 766, 1 Q, 1 BD, 77 R, 83.36, DIG. 1, DIG. 12, 1 HA, 518

[56] References Cited
U.S. PATENT DOCUMENTS

| 3,325,118 | 6/1967 | Hall | 214/77 R X |
|---|---|---|---|
| 3,604,650 | 9/1971 | Wennerberg | 242/67.1 R |
| 3,880,305 | 4/1975 | Van Polen | 242/86.52 X |
| 3,908,846 | 9/1975 | Brummitt | 242/86.5 R X |
| 3,946,887 | 3/1976 | Parker | 214/147 G |
| 3,958,772 | 5/1976 | Hynson | 214/147 G X |
| 3,968,940 | 7/1976 | Godbersen | 242/86.5 R |
| 4,015,739 | 4/1977 | Cox | 214/DIG. 4 X |

Primary Examiner—Harvey C. Hornsby
Assistant Examiner—John M. Jillions
Attorney, Agent, or Firm—Zarley, McKee, Thomte, Voorhees & Sease

[57] ABSTRACT

A round bale trailer includes a conveyor running the length thereof with a hay bale unrolling machine at the rear end. The unrolling machine includes a pointed spindle pivotal between a rearwardly extending loading and unrolling position and a forwardly extending engaging and disengaging position. Operation of the conveyor away from the machine disengages the bale from the spindle while operation in the opposite direction impales the bale on the spindle. A collar is mounted on the spindle and includes radially spaced apart hay-engaging teeth for rotating the bale when driven by a hydraulic motor.

12 Claims, 8 Drawing Figures

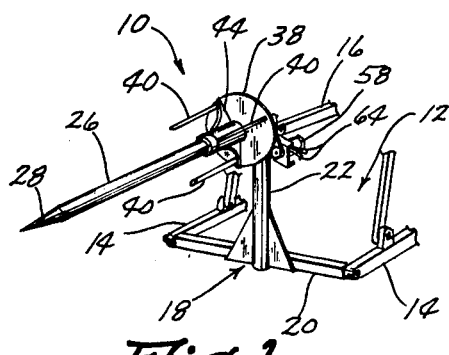
Fig. 1
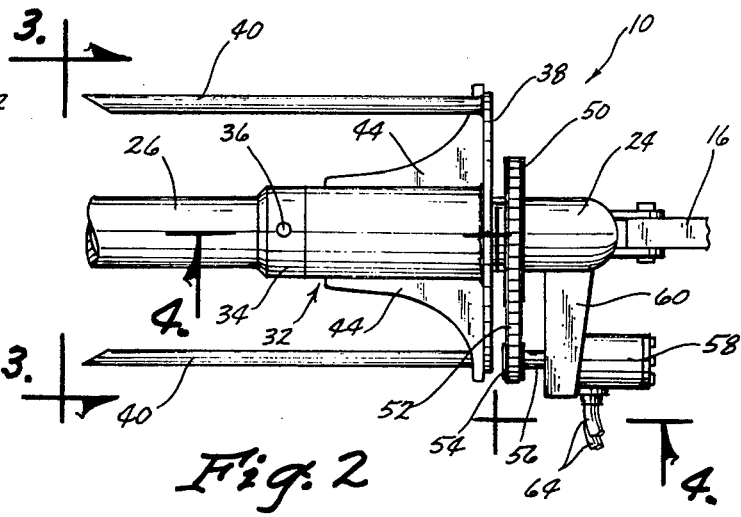
Fig. 2
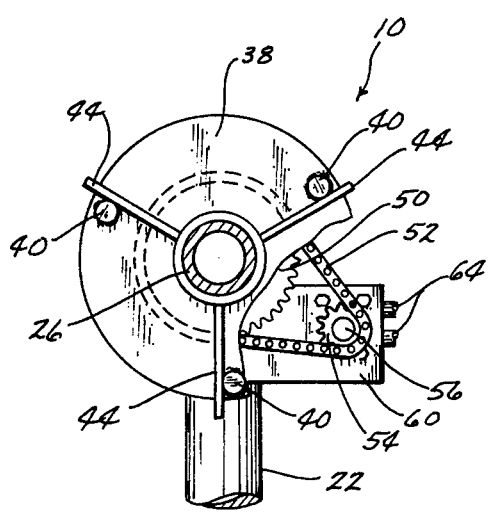
Fig. 3
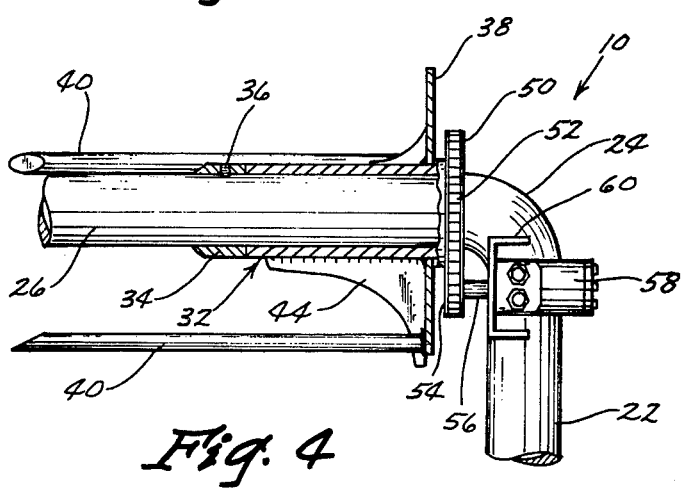
Fig. 4
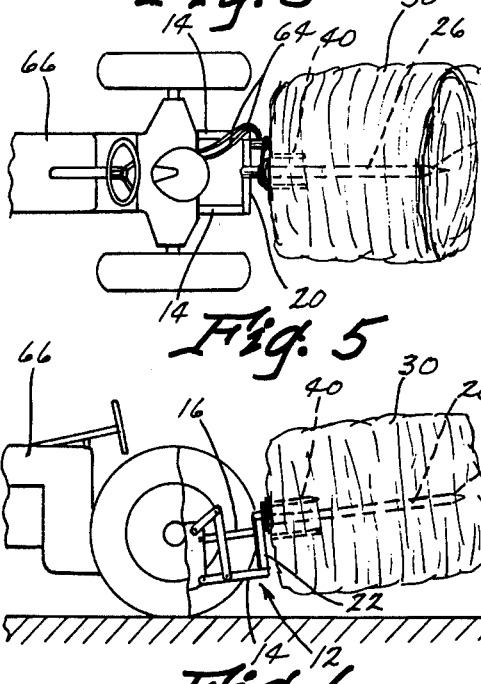
Fig. 5
Fig. 6
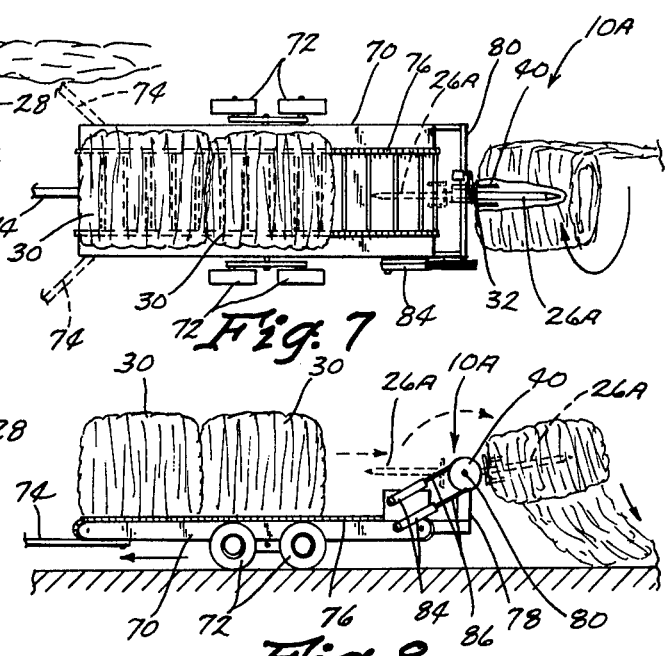
Fig. 7
Fig. 8

ROUND BALE LOADING AND UNROLLING MACHINE

BACKGROUND OF THE INVENTION

Round bale-handling machines of various types have been employed for working with round bales. One of these machines is a "stabber" which includes a pointed shaft mounted on a three-point hitch of a tractor or other vehicle. Heretofore no means has been provided for unrolling the round bale on the stabber-type equipment It is the object of this invention to provide a means for loading the bale on the stabber-type equipment and then unrolling it.

SUMMARY OF THE INVENTION

The round bale loading and unrolling machine includes a spindle extending from an upstanding frame which may be mounted on a three-point hitch of a tractor or any other vehicle. A collar is rotatably mounted on the spindle and includes hay-engaging teeth extending parallel to the spindle. A hydraulic motor is connected to the collar for rotating it thereby rotating the round bale on the spindle and thereby unrolling it onto the ground.

The round bale hay-support spindle may be mounted on a round bale trailer at one end over a conveyor with the spindle being pivotal between a rearwardly extending position and a forwardly extending position. In the rearward extending position the bale may be unrolled onto the ground or, if desired, the bale on the ground may be impaled onto the spindle when the vehicle is moved rearwardly. In the forwardly extending position the bale may be loaded onto the spindle or unloaded therefrom depending on which direction the conveyor is moving.

DESCRIPTION OF THE DRAWINGS

FIG. 1 is a fragmentary perspective view of the round bale loading and unrolling machine mounted on a tractor three-point hitch.

FIG. 2 is a top plan fragmentary view thereof.

FIG. 3 is a fragmentary elevation view taken along line 3—3 in FIG. 2.

FIG. 4 is a cross sectional view taken along line 4—4 in FIG. 2.

FIG. 5 is a top plan view of the machine on a tractor and being operated to unroll a bale.

FIG. 6 is a side elevation view thereof.

FIG. 7 is a top plan view of the machine mounted on the rear end of a round bale trailer having a conveyor on its bed.

FIG. 8 is a side elevation view thereof illustrating the pivotal movement of the spindle between rearwardly and forwardly extending positions.

DESCRIPTION OF THE PREFERRED EMBODIMENT

The round bale loading and unrolling machine of this invention is referred to generally in FIG. 1 by the reference numeral 10 and is shown mounted on the three-point hitch 12 of a tractor (not shown) which includes lower lift arms 14 and an upper stabilizer arm 16.

A frame 18 for the bale machine includes a lower transversely extending member 20 connected to the lower lift arms 14 of the three-point hitch and an upstanding post 22 connected at its upper end to the stabilizer arm 16. As seen in FIG. 4, the post 22 has a bend 24 at 90° and merges into a spindle member 26 having a pointed outer free end 28. As seen in FIGS. 5 and 6, the spindle is substantially the length of a round bale 30. At the inner end of the spindle 26 a collar 32 is rotatably mounted and is held against longitudinal movement by an annular stop 34 locked to the spindle by a setscrew 36. The collar 32 includes a rear end wall 38 from which a plurality of annularly spaced apart hay-engaging fingers 40 extend in parallel relationship to the spindle 26 for engagement with the inner end 42 of a bale of hay as seen in FIG. 6. Each finger 40 includes a strengthening rib 44 which runs the length of the collar 32 along the spindle.

The collar 32 is rotated and the bale of hay in turn rotated therewith, as seen in FIG. 5, by a sprocket 50 being welded to the end wall 38 opposite the spindle 26. The sprocket 50 in turn is driven by a chain 52 connected to a gear 54 on a hydraulic motor shaft 56. The motor 58 is mounted on a mounting bracket 60 connected to the upstanding post 22. A pair of hydraulic hoses 64 extend from the motor 58 to the hydraulic system on the tractor 66, as seen in FIG. 5.

In operation it is seen that the round bale machine 10 may be mounted, if desired, on the three-point hitch of a tractor, as seen in FIGS. 5 and 6, and it is understood that the machine could be mounted on any other vehicle in a similar manner. When mounted on the three-point hitch, as illustrated, the spindle 26 may be pivoted between different angular positions relative to the horizontal for positioning to stab a round bale on the ground and may be positioned in an upwardly extending position for transporting the round bale to a feeding area. Additionally, the three-point hitch allows raising and lowering of the bale. The round bale 30 is impaled on the spindle 26 and at the same time the hay-engaging teeth 40 engage the hay outwardly of the center longitudinal axis and thus control the rotation of the bale on the spindle. Upon operation of the hydraulic motor 58 the collar 32 will rotate and in turn cause the bale 30 to rotate through force supplied to it by the fingers 40. The tractor 66 may be driven forwardly, if desired, to spread the hay out in a row, as seen in FIG. 5. The spindle is tilted upwardly sufficiently to maintain the bale on the spindle as it is being rotated. The speed of rotation may vary as desired with the 15 rpms being acceptable. As the bale becomes smaller it may be desirable to rotate the bale faster to cause it to continue to unroll. It is seen that the unit is trouble-free and involves a minimum number of parts. The drive chain 52 is free of the hay by being protected from the hay by the end wall 38 of the collar 32. The upstanding post 22 and the spindle 26 are formed from a single length of round tubular material by being bent at the upper corner 24.

An alternate use of the round-bale machine of FIGS. 1-6 is shown in FIGS. 7 and 8 and includes a round-bale trailer 70 having ground-support wheels 72 and a pivotal tongue 74 pivotal to one side or the other for allowing bales to be moved onto the trailer from the front end. A conveyor 76 runs the full length of the trailer and allows for the bales 30 to be moved in either direction, from front to rear or rear to front. At the rear end of the trailer an upstanding pair of posts 78 are provided on opposite sides and a shaft 80 extends therebetween. A spindle 26A is connected to the shaft 80 and is adapted to be pivoted from a rearwardly extending position, as shown in solid lines in FIG. 7 to a forwardly extending position shown in dash lines over the conveyor 76. Pivotal movement is caused by operation of hydraulic cylinders 84 connected to a cable 86 extending around a pulley 90 on one end of the shaft 80 such that as the cylinders 84 are extended and contracted the pulley 90 is rotated in one direction or the other causing the spindle 26A to be pivoted. The spindle 26A includes a collar 32 and hay-engaging teeth 40 as in the embodiment in FIGS. 1-6 and thus allows unrolling of the hay in a similar fashion.

In operation the unit 10A may be used in several different ways. The hay may actually be loaded onto the trailer by the trailer being backed up with the spindle 26A extending rearwardly thereby impaling the bale onto the spindle. Pivoting of the spindle to the forwardly extending position then allows the hay to be positioned over the conveyor 76 and operation of the conveyor forwardly moves the hay to the position of FIG. 8 allowing at least three bales to be loaded onto the bed of the trailer. When it is desired to unload the bales they may be either unloaded off the front end or through use of the unit 10A by positioning the spindle 26A in its forwardly extending position and then operating the conveyor to cause the bale to be impaled on the spindle as it moves rearwardly. Thereupon the spindle is pivoted to its rearwardly extending position and the motor 58 is operated to cause the bale to be unrolled as seen in FIGS. 7 and 8.

I claim:

1. A vehicle-mounted round-bale handling and unrolling machine comprising,
    a vehicle having a longitudinal axis parallel to the line of travel of said vehicle,
    a substantially horizontally extending nonrotatable spindle parallel to said vehicle longitudinal axis and adapted to penetrate a bale of hay along its longitudinal axis as said vehicle is moved towards a bale,
    hay-engaging means positioned radially outwardly of said spindle for engagement with said hay radially outwardly of its axial center for rotation about said spindle and its longitudinal axis, and
    power means connected to said hay-engaging means for rotating said hay-engaging means and a bale of hay on said spindle for dispensing said hay by unrolling it.

2. The structure of claim 1 wherein said hay-engaging means is further defined as including a collar rotatably mounted on said spindle and a plurality of hay-engaging teeth being provided on said collar for engagement with the end of said round bale of hay to rotate it as said collar is rotated by said power means.

3. The structure of claim 2 wherein said teeth are elongated and extend in parallel relationship to said spindle.

4. The structure of claim 2 wherein said spindle is pointed on its outer free end and said teeth are pointed on their free ends and said teeth are substantially shorter in length than said spindle which extends the substantial length of a round bale along its axial center.

5. The structure of claim 1 wherein said spindle is mounted on an upstanding frame member mounted on a three-point hitch.

6. The structure of claim 2 wherein said power means includes a drive wheel connected to said collar opposite said spindle and said power means is connected to said drive wheel for rotating said collar and hay bale.

7. The structure of claim 6 wherein said drive wheel has a smaller diameter than said collar whereby said collar protects said drive wheel from becoming entangled in hay.

8. The structure of claim 7 wherein said drive means further includes a motor connected to said drive wheel for rotating said collar and hay bale.

9. The structure of claim 2 wherein said machine is mounted at one end of a hay vehicle having a conveyor means moving along its bed surface, said spindle being pivotable between a first position extending rearwardly for engagement with a bale of hay on the ground and a second position extending forwardly over said conveyor means on said bed for said conveyor means to engage said bale and remove it from said spindle as it moves parallel to and away from said spindle or to move said bale onto said spindle as said conveyor means moves towards said spindle.

10. A round bale vehicle having an unrolling machine comprising,
    a vehicle having a bale conveyor on its support bed, and
    a round bale unrolling machine positioned on said vehicle over said bed and conveyor and having a bale spindle pivotable between a first position extending rearwardly of said vehicle to a second position extending forwardly thereof over said conveyor in parallel relationship whereby operation of said conveyor towards said spindle moves a hay bale into engagement with said spindle and operation away from said spindle moves a hay bale off of said spindle.

11. The structure of claim 10 wherein said spindle includes hay-engaging means positioned radially outwardly of said spindle for engagement with said hay radially outwardly of its axial center and for rotation about the longitudinal axis of said spindle, and power means for rotating said hay-engaging means and a bale of hay on said spindle for dispensing said hay by unrolling it.

12. The structure of claim 11 wherein said hay-engaging means is further defined as including a collar rotatably mounted on said spindle and a plurality of hay-engaging teeth being provided on said collar for engagement with the end of said round bale of hay to rotate it as said spindle is rotated by said power means.

* * * * *